(12) United States Patent
Liu et al.

(10) Patent No.: US 11,321,431 B2
(45) Date of Patent: May 3, 2022

(54) DATA PROCESSING, WATERMARK EMBEDDING AND WATERMARK EXTRACTION

(71) Applicant: Alibaba Group Holding Limited, Grand Cayman (KY)

(72) Inventors: Yongliang Liu, Hangzhou (CN); Li Li, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 307 days.

(21) Appl. No.: 16/660,525

(22) Filed: Oct. 22, 2019

(65) Prior Publication Data

US 2020/0125699 A1 Apr. 23, 2020

(30) Foreign Application Priority Data

Oct. 23, 2018 (CN) .......................... 201811238889.1

(51) Int. Cl.
*G06F 21/00* (2013.01)
*G06F 21/16* (2013.01)
*G06F 11/10* (2006.01)
*G06F 16/901* (2019.01)

(52) U.S. Cl.
CPC .......... *G06F 21/16* (2013.01); *G06F 11/1004* (2013.01); *G06F 16/901* (2019.01)

(58) Field of Classification Search
CPC .... G06F 21/16; G06F 16/901; G06F 11/1004; H04N 21/8358; H04N 21/854; H04N 1/32144
See application file for complete search history.

(56) References Cited

U.S. PATENT DOCUMENTS

| | | | | |
|---|---|---|---|---|
| 6,804,779 | B1 * | 10/2004 | Carroni .................. | G06F 21/10 713/150 |
| 7,562,228 | B2 * | 7/2009 | Kirovski ............... | G10L 19/018 713/186 |
| 7,747,858 | B2 * | 6/2010 | Serret-Avila ....... | H04N 21/8358 713/168 |
| 8,180,098 | B2 * | 5/2012 | Kalker ............. | H04N 21/23892 382/100 |

(Continued)

FOREIGN PATENT DOCUMENTS

| | | |
|---|---|---|
| CN | 103049682 | 4/2013 |
| CN | 106803042 | 6/2017 |

OTHER PUBLICATIONS

Chinese Office Action for Chinese patent corresponding to U.S. Appl. No. 16/660,525, dated Dec. 22, 2021, 18 Pages.

(Continued)

*Primary Examiner* — Hosuk Song
(74) *Attorney, Agent, or Firm* — Lee & Hayes, P.C.

(57) ABSTRACT

A method including obtaining a data query request sent by a client terminal; obtaining first query request data based on the data query request; duplicating the first query request data to obtain second query request data; embedding identifier information of the client terminal as watermark information into the second query request data to obtain watermarked query request data; and feeding the watermarked query request data back to the client terminal. The techniques of the present disclosure solve the problem of failure to track leakage during data breach.

15 Claims, 9 Drawing Sheets

(56) References Cited

U.S. PATENT DOCUMENTS

| | | | | |
|---|---|---|---|---|
| 8,990,876 | B2* | 3/2015 | Kim | H04N 21/4394 |
| | | | | 725/115 |
| 9,460,275 | B1* | 10/2016 | Puppin | G06F 21/16 |
| 9,848,230 | B2* | 12/2017 | An | H04N 21/8133 |
| 10,846,377 | B2* | 11/2020 | Goyal | G06F 21/10 |
| 2015/0163563 | A1* | 6/2015 | An | H04N 21/435 |
| | | | | 725/18 |
| 2015/0334459 | A1* | 11/2015 | Oh | H04N 21/8133 |
| | | | | 725/113 |

OTHER PUBLICATIONS

Chinese Search Report for Chinese patent corresponding to U.S. Appl. No. 16/660,525, dated Dec. 15, 2021, 1 Page.

Zhou, et al, Realization of user based selective watermarking RDBMS, School of Software, Tsinghua University, Beijing, vol. 25, No. 1, Jan. 2008, 7 Pages.

* cited by examiner

ACQUIRE WATERMARKED QUERY REQUEST DATA, WATERMARK
INFORMATION INCLUDING IDENTIFIER INFORMATION OF CLIENT TERMINAL
S502

EXTRACT WATERMARK INFORMATION FROM QUERY REQUEST DATA
S504

DATA PROCESSING, WATERMARK EMBEDDING AND WATERMARK EXTRACTION

CROSS REFERENCE TO RELATED PATENT APPLICATIONS

This application claims priority to and is a continuation of Chinese Patent Application No. 201811238889.1, filed on 23 Oct. 2018 and entitled "Method, Apparatus and Device for Data Processing, Watermark Embedding and Watermark Extraction," which is incorporated herein by reference in its entirety.

TECHNICAL FIELD

The present disclosure relates to digital watermark embedding technologies, and, more specifically, relates to methods, apparatuses, electronic devices, and storage devices for data processing. The present disclosure also relates to methods, apparatuses, electronic devices, and storage devices for watermark embedding. The present disclosure also relates to methods, apparatuses, electronic devices, and storage devices for watermark extraction.

BACKGROUND

Data is not only an important asset of an enterprise but also one of the core competitive advantages of the enterprise. Moreover, its potential value is difficult to estimate. Therefore, data security has attracted the great attention and active input from government officials, industrial giants, experts and scholars. Malicious data leakage incidents are common at present. Billion pieces of data of various companies are breached, and the trend has become worse and worse.

Large amounts of company data are kept in various databases. There are also lots of data existing in the form of Txt, Excel and Word documents. Such documents may be tracked by a watermark based on the file format, but it will be impossible to trace the source of data once the data is isolated from the file format (which is very easy).

Therefore, watermark information needs to be embedded into both the data in databases and the data relying on a file format, thereby ensuring leakage traceability if there is a data breach.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides method, apparatuses, electronic devices and storage devices for data processing to solve the problem of failure to track leakage during data breach.

The present disclosure provides a method for data processing including:
obtaining a data query request sent by a client terminal;
obtaining first query request data based on the data query request;
duplicating the first query request data to obtain second query request data;
embedding watermark information such as identifier information of the client terminal into the second query request data to obtain watermarked query request data; and
sending the watermarked query request data to the client terminal.

The watermark query request data is embedded with the watermark information

For example, the method further includes:
determining to-be-watermarked carrier object data in the second query request data; and
the embedding identifier information of the client terminal as watermark information into the second query request data to obtain watermarked query request data includes:
embedding the identifier information of the client terminal as watermark information into the carrier object data to obtain the watermarked query request data.

For example, the embedding the identifier information of the client terminal as watermark information into the carrier object data includes at least one of the following manners:
embedding the watermark information into the carrier object data by using an error correcting code;
inserting the watermark information as data into the carrier object data in accordance with a preset watermark embedding rule; or
embedding the watermark information as key information into the carrier object data.

For example, the method further includes:
determining a manner of embedding the watermark information into the carrier object data; and
the embedding the identifier information of the client terminal as watermark information into the carrier object data includes: embedding the identifier information of the client terminal as watermark information into the carrier object data in accordance with the determined manner of embedding the watermark information into the carrier object data.

For example, the embedding the watermark information into the carrier object data by using an error correcting code includes:
converting the carrier object data into binary data;
encoding the binary data by using a Hamming encoding scheme with an error correcting capability to obtain encoded carrier object data;
converting the watermark information into binary watermark information;
embedding the binary watermark information into the encoded carrier object data to obtain watermarked carrier object data; and
converting the watermarked carrier object data into decimal data.

For example, the inserting the watermark information as data into the carrier object data in accordance with a preset watermark embedding rule includes: inserting the binary information of the watermark information as data into binary or decimal data of the carrier object data in accordance with the preset watermark embedding rule.

For example, the method further includes: informing the client terminal of watermarked identifier information.

For example, the informing the client terminal of watermarked identifier information includes adding the watermarked identifier information to an end of the watermarked carrier object data.

For example, the embedding the watermark information as key information into the carrier object data further includes feeding encryption identifier information and/or encrypted key information of the watermark information back to the client terminal.

For example, the method further includes:
feeding position information where the watermark information is embedded back to the client terminal.

The present disclosure further provides a method for data processing, including:
sending a data query request to a server terminal;
receiving watermarked query request data returned from the server terminal; and
recovering first query request data from the watermarked query request data.

For example, the recovering first query request data from the watermarked query request data includes deleting watermark information in the watermarked query request data to obtain the first query request data.

For example, the deleting watermark information in the watermarked query request data to obtain the first query request data includes:
converting decimal carrier object data in the watermarked query request data into binary data;
deleting an error correction bit in the binary data; and
converting the binary data with the error correction bit deleted into decimal data to obtain the first query request data.

For example, the deleting watermark information in the watermarked query request data to obtain the first query request data includes:
determining whether the query request data is watermarked based on watermarked identifier information;
removing the watermarked identifier information in the query request data if the query request data is watermarked; and
deleting binary information of the watermark information in the binary or decimal data of the carrier object data in accordance with a preset watermark recovery rule to obtain the first query request data.

The present disclosure further provides a method for watermark embedding, including:
obtaining first query request data based on a data query request;
duplicating the first query request data to obtain second query request data; and
embedding identifier information of a client terminal as watermark information into the second query request data to obtain watermarked query request data.

For example, the method further includes:
determining to-be-watermarked carrier object data in the second query request data; and
the embedding watermark information such as identifier information of a client terminal into the second query request data to obtain watermarked query request data includes embedding the identifier information of the client terminal as watermark information into the carrier object data to obtain the watermarked query request data.

For example, the embedding the identifier information of the client terminal as watermark information into the carrier object data includes at least one of the following manners:

embedding the watermark information into the carrier object data by using an error correcting code;
inserting the watermark information as data into the carrier object data in accordance with a preset watermark information embedding rule; or
embedding the watermark information as key information into the carrier object data.

For example, the embedding the watermark information into the carrier object data by using an error correcting code includes:
converting the carrier object data into binary data;
encoding the binary data by using a Hamming encoding scheme with an error correcting capability to obtain encoded carrier object data;
converting the watermark information into binary watermark information;
embedding the binary watermark information into the encoded carrier object data; and
converting the watermarked carrier object data into decimal data.

For example, the inserting the watermark information as data into the carrier object data in accordance with a preset watermark embedding rule includes inserting the binary information of the watermark information as data into binary or decimal data of the carrier object data in accordance with the preset watermark embedding rule.

For example, the method further includes:
adding watermarked identifier information to an end of the watermarked carrier object data.

The present disclosure further provides a method for watermark extraction, including:
acquiring watermarked query request data, the watermark information including identifier information of a client terminal; and
extracting the watermark information from the query request data.

For example, the extracting the watermark information from the query request data includes:
converting decimal carrier object data in the query request data into binary data; and
performing logical negation operation processing on an error correction bit at an error correction bit position of the binary data to obtain the watermark information.

For example, the extracting the watermark information from the query request data includes:
determining whether the query request data is watermarked based on watermarked identifier information;
determining an embedding position of the watermark information in accordance with a preset watermark recovery rule if the query request data is watermarked; and
extracting the watermark information from the embedding position.

The present disclosure further provides an apparatus for data processing, including:
a data query request obtaining unit configured to obtain a data query request sent by a client terminal;
a first query request data obtaining unit configured to obtain first query request data based on the data query request;
a second query request data obtaining unit configured to duplicate the first query request data to obtain second query request data;
a query request data obtaining unit configured to embed identifier information of the client terminal as watermark information into the second query request data to obtain watermarked query request data; and a query request data returning unit configured to feed the watermarked query request data back to the client terminal.

The present disclosure further provides an electronic device, including:
- a processor; and
- a memory configured to store a program of a method for data processing, where the device, after being powered on and running the program of the method for data processing by the processor, executes the following steps:
  - obtaining a data query request sent by a client terminal;
  - obtaining first query request data based on the data query request;
  - duplicating the first query request data to obtain second query request data;
  - embedding identifier information of the client terminal as watermark information into the second query request data to obtain watermarked query request data; and
  - feeding the watermarked query request data back to the client terminal.

The present disclosure further provides a storage device, storing a program of a method for data processing. The program or computer-readable instructions are run by a processor to execute the following steps:
- obtaining a data query request sent by a client terminal;
- obtaining first query request data based on the data query request;
- duplicating the first query request data to obtain second query request data;
- embedding identifier information of the client terminal as watermark information into the second query request data to obtain watermarked query request data; and
- feeding the watermarked query request data back to the client terminal.

The present disclosure further provides an apparatus for data processing, including:
- a data query request sending unit configured to send a data query request to a server terminal;
- a query request data receiving unit configured to receive watermarked query request data returned from the server terminal; and
- a first query request data recovering unit configured to recover first query request data from the watermarked query request data.

The present disclosure further provides an electronic device, including:
- a processor; and
- a memory configured to store a program of a method for data processing, where the device, after being powered on and running the program of the method for data processing by the processor, executes the following steps:
  - sending a data query request to a server terminal;
  - receiving watermarked query request data returned from the server terminal; and
  - recovering first query request data from the watermarked query request data.

The present disclosure further provides a storage device, storing a program of a method for data processing, wherein the program is run by a processor to execute the following steps:
- sending a data query request to a server terminal;
- receiving watermarked query request data returned from the server terminal; and
- recovering first query request data from the watermarked query request data.

Compared with conventional techniques, the present disclosure has the following technical advantages.

A method, apparatus, electronic device and storage device for data processing provided in the present disclosure embed identifier information of a client terminal as watermark information into second query request data to obtain watermarked query request data; and feed watermarked query request data back to the client terminal, to solve the existing problem of failure to track leakage after data breach.

BRIEF DESCRIPTION OF THE DRAWINGS

In order to illustrate the technical solutions in the example embodiments of the present disclosure, the following briefly describes the accompanying drawings which aid in describing the example embodiments. Apparently, the accompanying drawings in the following description merely representing some of the example embodiments of the present disclosure, and persons of ordinary skill in the art may derive other drawings from these accompanying drawings without creative efforts.

DETAILED DESCRIPTION

Numerous specific details are set forth in the description below to facilitate thorough understanding of the present disclosure. However, the present disclosure may be implemented by many other manners different from the manners described here, and those skilled in the art can make similar promotions without departing from the connotation of the present disclosure. Therefore, the present disclosure is not limited to specific example embodiments disclosed below.

Example embodiment I of the present disclosure provides a method for data processing, which is described in detail below in conjunction with FIG. 1.

Figure 1:
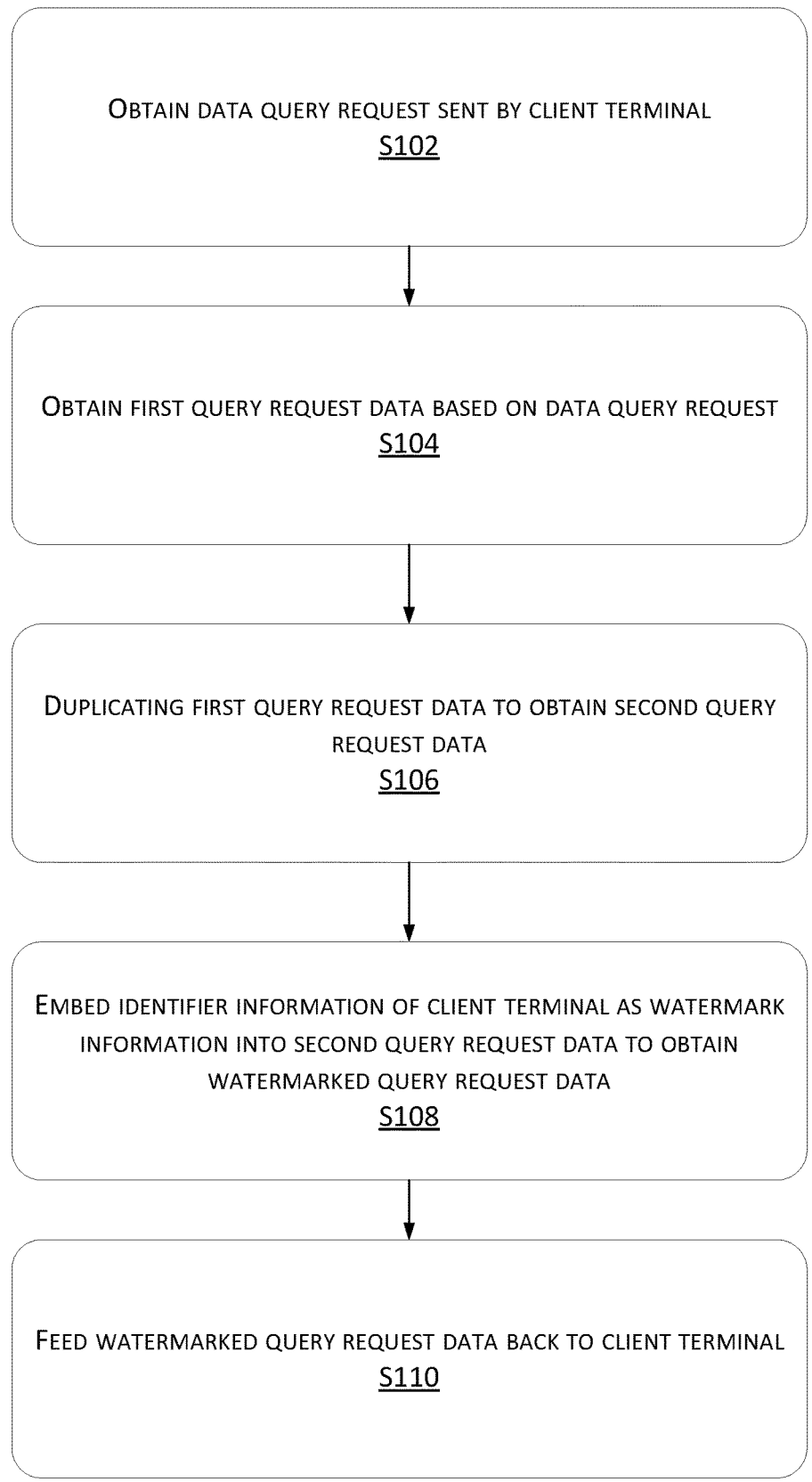
FIG. 1 is a flowchart of a method for data processing provided in example embodiment I of the present disclosure.

As shown in FIG. 1, step S102 includes obtaining a data query request sent by a client terminal.

The data query request includes a database query request or a dataset query request sent by the client terminal.

The obtaining a data query request sent by a client terminal means that a database or dataset server terminal obtains the data query request sent by the client terminal.

As shown in FIG. 1, step S104 includes obtaining first query request data based on the data query request.

The first query request data refers to first query request data found or searched from a database or dataset based on the data query request. For example, the first query request data is a search result base don the data query request.

The first query request data includes at least one data record in the database or dataset.

As shown in FIG. 1, step S106 includes duplicating the first query request data to obtain second query request data.

The second query request data is duplicated first query request data.

This step duplicates the first query request data to obtain the second query request data, thus providing a to-be-embedded carrier object for a watermark.

As shown in FIG. 1, step S108 includes embedding identifier information of the client terminal as watermark information into the second query request data to obtain watermarked query request data.

The identifier information of the client terminal includes: unique identification information of the client terminal.

In an example embodiment, partial data of the watermarked second query request data may be selected for use as the watermarked carrier object data, and the method may further include: determining to-be-watermarked carrier object data in the second query request data; and the embedding identifier information of the client terminal as watermark information into the second query request data to obtain watermarked query request data includes: embedding the identifier information of the client terminal as watermark information into the carrier object data to obtain the watermarked query request data.

The embedding the identifier information of the client terminal as watermark information into the carrier object data includes at least one of the following manners:
  embedding the watermark information into the carrier object data by using an error correcting code;
  inserting the watermark information as data into the carrier object data in accordance with a preset watermark embedding rule; or
  embedding the watermark information as key information into the carrier object data.

The server terminal may first determine a manner of embedding the watermark information into the carrier object data; and then embed the identifier information of the client terminal as watermark information into the carrier object data in accordance with the determined manner of embedding the watermark information into the carrier object data.

The embedding the watermark information into the carrier object data by using an error correcting code includes:
  converting the carrier object data into binary data;
  encoding the binary data by using a Hamming encoding scheme with an error correcting capability to obtain encoded carrier object data;
  converting the watermark information into binary watermark information;
  embedding the binary watermark information into the encoded carrier object data; and
  converting the watermarked carrier object data into decimal data.

A process of embedding the watermark information into the carrier object data by using an error correcting code will be introduced below in conjunction with specific examples: providing a specific embedding rule: i.e., embedding '1' means to modify a bit '0' in data into '1,' and embedding '0' means to modify a bit '1' in the data into '0.' In practice, different watermark information embedding rules, or even a more complex embedding rule, may be provided. Particularly, in the case where the error correcting capability is more than 1 bit, a plurality of bits of watermark information may be embedded into a single piece of data.

A watermark embedding process:
1) First, a decimal numeral of carrier object data is converted into a binary numeral. Assuming that to-be-embedded carrier object data is a decimal numeral of 13, 13 is first converted into a binary numeral to obtain 1101.
2) Then, the resulting binary numeral is encoded by using a Hamming encoding scheme with a "1-bit" error correcting capability to obtain encoded carrier object data. In the above example, an encoded result C1=1101001 is obtained.
3) Watermark information is converted into binary watermark information. Assuming that the binary watermark information is 1, i.e., a bit '1' needs to be embedded. Because the to-be-embedded bit is '1,' a third bit '0' in C1 may be modified into '1,' to obtain C2=1111001.
4) The watermarked carrier object data is converted into decimal data. In the above example, C2 is converted into a decimal numeral C3=121. C3 is the resulting watermarked data.

A process of inserting the watermark information as data into the carrier object data in accordance with a preset watermark embedding rule will be introduced below in conjunction with specific examples.

It is assumed that the preset embedding rule is as follows: embedding a bit '1' means to insert a digit "1" into a bit of the carrier object data; similarly, embedding a bit '0' means to insert a digit "0" into a bit of the carrier object data; and an embedding position may be determined by adding a position identifier to a header of the numeral obtained after inserting "1" or "0."

Assuming that the to-be-watermarked carrier object data is decimal 85013, to-be-embedded watermark bit information is '1.'

A result obtained after embedding the bit information '1' into original data 85013 is 3815013, where the digit "3" represents that the embedded digit "1" is located at a 3rd bit from left of the watermarked carrier object data.

It should be noted that the binary information of the watermark information in the above example is inserted as data into decimal data of the carrier target data, or the binary information of the watermark information may be inserted as data into the binary data of the carrier object data. Specifically, the decimal data of the carrier object data may be first converted into binary data, a binary form of the watermark information is inserted into the binary data of carrier object data, and then the binary data of the carrier object data is converted into the decimal data. For example, assuming that the to-be-watermarked carrier object data is decimal 85013, to-be-embedded watermark bit information is '1.' First, original data 85013 are converted into binary data "1.0100.1100.0001.0101," and a result obtained after embedding the bit information '1' into the binary data is "1111.0100.1100.0001.0101," where leftmost two digits "11" represent that the embedded digit information "1" is located at the 3rd bit from left of the watermarked carrier object data.

When the binary information of the watermark information is inserted as data into the decimal data of the carrier target data, the server terminal may further inform the client terminal of watermarked identifier information. In a practical application scenario, an identifier as to whether the carrier object data is watermarked may be provided, even though this is independent of the watermark embedding and recovery principles. The identifier information may be computed through a mechanism together with a data associator, e.g., as a stand-alone field in a data record, or through some mechanisms. For example, the identifier information is computed with secret information and some fields in the data record as parameters. The informing the client terminal of watermarked identifier information includes: adding the watermarked identifier information to an end of the watermarked carrier object data. For example, for the above example 85013, the watermarked data and identifier may simultaneously arise in the form of "3815013 W," or "3815013 . . . Y," or "3815013 . . . '1.'

A process of embedding the watermark information as key information into the carrier object data will be introduced below in conjunction with specific examples.

1) Initialization: each client terminal stores a plurality of identical data encryption keys, and unique identifier information of the client terminal. There is a corresponding relationship between keys and one or more minimum partitions of identifiers. For example, client terminals A and B both store two keys K1 and K2, an identifier of A is 0110, and an identifier of B is 1011. The corresponding relationship between the keys and the one or more minimum partitions of identifiers is that: if a current bit of an identifier is '0,' then the identifier is encrypted by using the key K2, or otherwise, the identifier is encrypted by using the key K1.

2) Generating different encrypted data samples. How to generate different encrypted data samples will be illustrated below by way of examples. It is assumed that identical carrier object data D1, D2, D3, and D4 are queried at both the client terminals A and B. An encrypted data sample generated for A is SQA={$Enc(D1,K2),Enc(D2,K1),Enc(D3,K1),Enc(D4,K2)$};

An encrypted data sample generated for B is

SQB={$Enc(D1,K1),Enc(D2,K2),Enc(D3,K1),Enc(D4,K1)$};

Enc is an encryption function, D1, D2, D3, and D4 represent to-be-encrypted data, and K1 and K2 represent keys used for encryption.

For queries at A and B, a server-terminal application returns a query result SQA and a query result SQB, respectively.

The embedding the watermark information as key information into the carrier object data further includes:

feeding encryption identifier information and encrypted key information of the watermark information back to the client terminal.

Whether data is encrypted may be identified with a unified encrypted identifier, or with a different encrypted identifier. Functions of the encrypted identifier may also be replaced with other mechanisms. For example, the data may merely include information of an encryption key for determining that the data is encrypted or information assisting in determining the encryption key. Of course, the data may also include both the encrypted identifier as to whether the data is encrypted and the information of the encryption key for determining that the data is encrypted, or merely include the encrypted identifier without auxiliary information. An example of determining a data encryption key information is as follows. The information may be computed by the following manner:

$H1 = \text{Hash}(D1, D2, \ldots, Dn, \text{AppKey}) \oplus \text{ID}$ or   ①

$H1 = \text{Hash}(D1, D2, \ldots, Dn, \text{ID}, \text{AppKey})$ or   ②

$H1 = \text{Hash}(\text{ID}, \text{AppKey}, \text{PrimaryKey})$ or   ③

$H1 = \text{Hash}(\text{AppKey}, \text{PrimaryKey}) \oplus \text{ID}$   ④

$\oplus$ represents an XOR operation, ID represents a unique identifier of a client-terminal application, and AppKey represents a common key of such client-terminal applications. A computing manner including a PrimaryKey applies to a data record having the PrimaryKey. For the first case, when a Hash result does not match an ID length, cutoff processing or filling a specific bit may be implemented. A bit sequence is obtained by the above two computing manners. It can be stipulated that which key is used for encryption is determined in accordance with a bit sequence value. For example, when there are only two keys K1 and K2, if a current bit of the bit sequence is '1,' then the encryption key K1 is used, or otherwise, the encryption key K2 is used.

In addition, a data number (serial number) of a watermark may be added to avoid errors such as insertion or deletion, which impact subsequent decrypted synchronization information.

The identifier information of the client terminal in the above three manners may be destroyed, but destroying the identifier information will make data unavailable. Furthermore, in order to ensure the reliability of the identifier information, a mechanism of error correction or integrity verification of the identifier information may be added. Moreover, the identifier information as to whether the query request data is watermarked may be disclosed.

In order to ensure that the client terminal can correctly extract the first query request data, the server terminal may further feed position information where the watermark information is embedded back to the client terminal.

As shown in FIG. 1, step S110 includes feeding the watermarked query request data back to the client terminal.

The watermarked query request data is fed back to the client terminal. Even if the watermarked query request data is attacked by an attacker during the process, since the query request data is watermarked, the attacker, even if obtaining the data, still cannot use the data.

example embodiment II of the present disclosure provides a method for data processing. An executing entity of example embodiment II of the present disclosure may be a client terminal, which is described in detail below in conjunction with FIG. 2.

Figure 2:
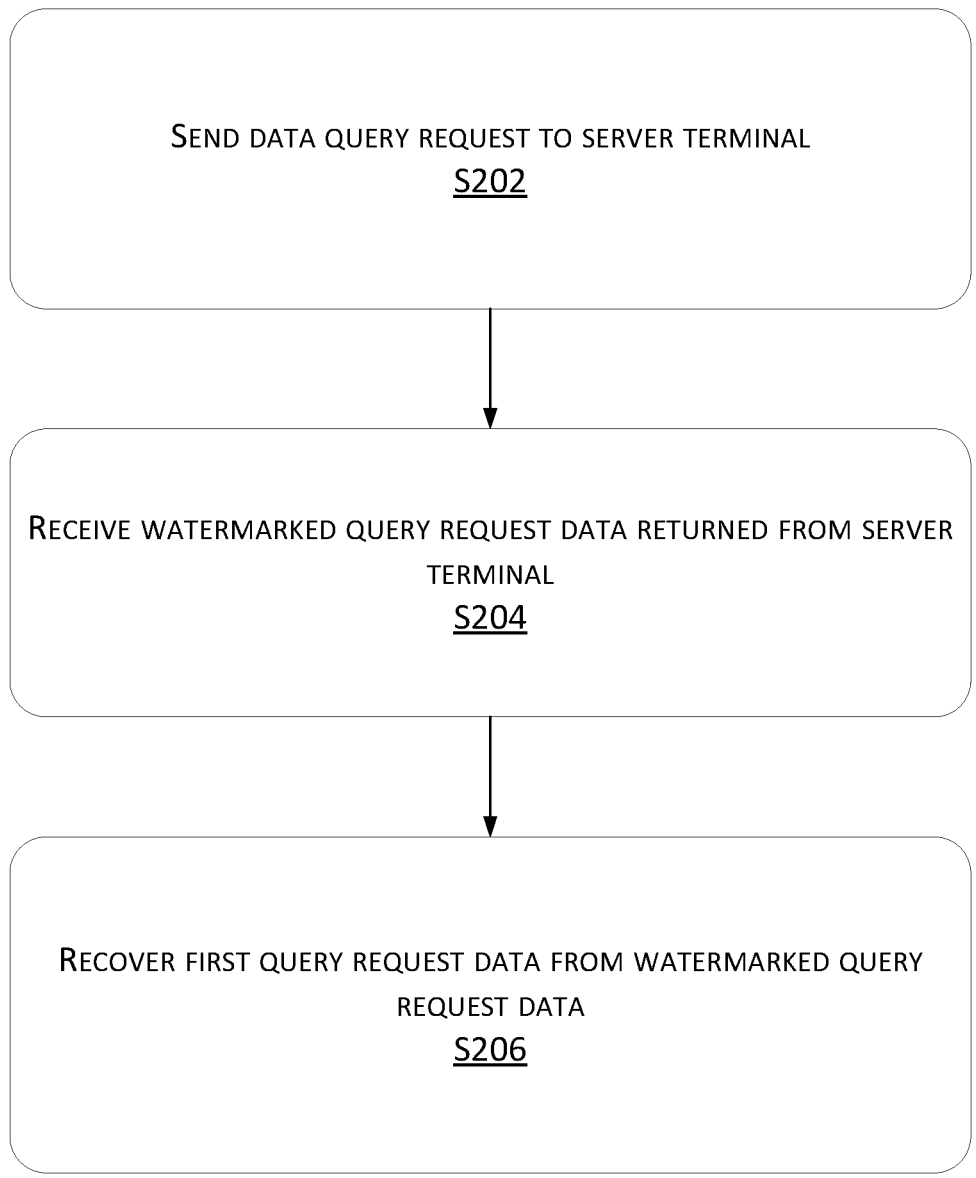
FIG. 2 is a flowchart of a method for data processing provided in example embodiment II of the present disclosure.

As shown in FIG. 2, step S202 includes sending a data query request to a server terminal.

The sending a data query request to a server terminal means that the client terminal sends a data query request to the server terminal.

As shown in FIG. 2, step S204 includes receiving watermarked query request data returned from the server terminal.

The watermarked query request data returned from the server terminal may be obtained by the following manner:

obtaining a data query request sent by a client terminal;

obtaining first query request data based on the data query request;

duplicating the first query request data to obtain second query request data; and embedding identifier information of a client terminal as watermark information into the second query request data to obtain watermarked query request data.

As shown in FIG. 2, step S206 includes recovering first query request data from the watermarked query request data.

The first query request data refers to original data obtained by the server terminal based on the data query request.

Before using the obtained watermarked query request data, the client terminal needs to recover the first query request data from the watermarked query request data.

The client terminal may perform various kinds of desired computing by using the recovered first query request data, but restricts outputting all data results obtained from the recovering first query request data from the watermarked query request data.

The recovering first query request data from the watermarked query request data includes: deleting watermark information in the watermarked query request data to obtain the first query request data.

The deleting watermark information in the watermarked query request data to obtain the first query request data includes:

converting decimal carrier object data in the watermarked query request data into binary data;

deleting an error correction bit in the binary data; and converting the binary data with the error correction bit deleted into decimal data to obtain the first query request data.

Still using the example in example embodiment I, the server terminal embeds the watermark information into the carrier object data by using an error correcting code. After receiving the watermarked query request data (a watermarked message in the data may be obtained through a notification mechanism), the client terminal may recover the watermarked query request data to the original data as follows. It is assumed that the decimal carrier object data of the received query request data is C3'=421.

1) First, the decimal data C3'=121 are converted into binary data C2'=1111001 Using an error correction principle: an incorrect bit may be positioned from a codon C2'=1111001, i.e., a third bit '1' from left, C1'=1101001 is obtained after error correction of the bit. Decimal data 13 are obtained after removing the error correction bit and re-converting the data into the decimal data. 13 is unwatermarked carrier object data in the query request data. The query request data including the unwatermarked carrier object data is the first query request data.

The deleting watermark information in the watermarked query request data to obtain the first query request data includes:

determining whether the query request data is watermarked based on watermarked identifier information;

removing the watermarked identifier information in the query request data if the query request data is watermarked; and deleting binary information of the watermark information in the binary or decimal data of the carrier object data in accordance with a preset watermark recovery rule to obtain the first query request data.

Still using an example in example embodiment I, 1) whether the query request data is watermarked is determined based on the watermarked identifier information. It is assumed that the watermarked identifier information of the query request data is "W." During processing of data "3815013 W," "W" identifies that data "3815013" is watermarked, then it is necessary to remove watermarked identifier information in the query request data to obtain watermarked carrier object data "3815013." Only after data recovery of the watermarked carrier object data, can normal processing be performed.

2) The watermarked carrier object data is recovered in accordance with a preset watermark recovery rule (corresponding to a watermark embedding rule). For example, for the watermarked carrier object data "3815013," since a first digit is "3," an embedding position identifying an embedded bit '1' or '0' is the 3rd bit from left of the watermarked carrier object data. Since the 3rd bit is "1," the embedded watermark bit information in the data is '1,' and the watermarked carrier object data may be recovered to 85013, that is, a result obtained after removing the first digit "3" and the 3rd bit "1."

When the watermark information is embedded as key information into the carrier object data, a process of recovering the first query request data from the watermarked query request data is: 1) First, a query result is inputted into a client-terminal application. For example, for a query of a client-terminal application A, a returned query result is SQA={Enc(D1,K2),Enc(D2,K1),Enc(D3,K1),Enc(D4, K2)};

2) The client-terminal application reads its identifier, and then determines encryption/decryption keys based on the identifier information. Still using the above example, an identifier of a client-terminal application A is 0110, keys used for encrypting data being K2, K1, K1, and K2 successively may be determined based on a corresponding relationship between the identifier and the keys.

3) The client-terminal application decrypts the data by using determined data encryption keys. For the above example, the client-terminal application decrypts encrypted data successively by using keys K2, K1, K1, and K2 to obtain D1, D2, D3, and D4.

The above data recovery step is completed in the client-terminal application, and outputting the recovered data from the client terminal to an external device is restricted. On the management policy, distributing or forwarding the watermarked query request data (unrecovered data) is restricted to a certain extent. As can be further seen from the above data recovery process, in the data recovery process, corresponding watermark information may also be extracted. Whether the data is correctly recovered may be checked by adding CRC. A CRC value may contain related information, such as an embedding position and a notification.

Figure 3:
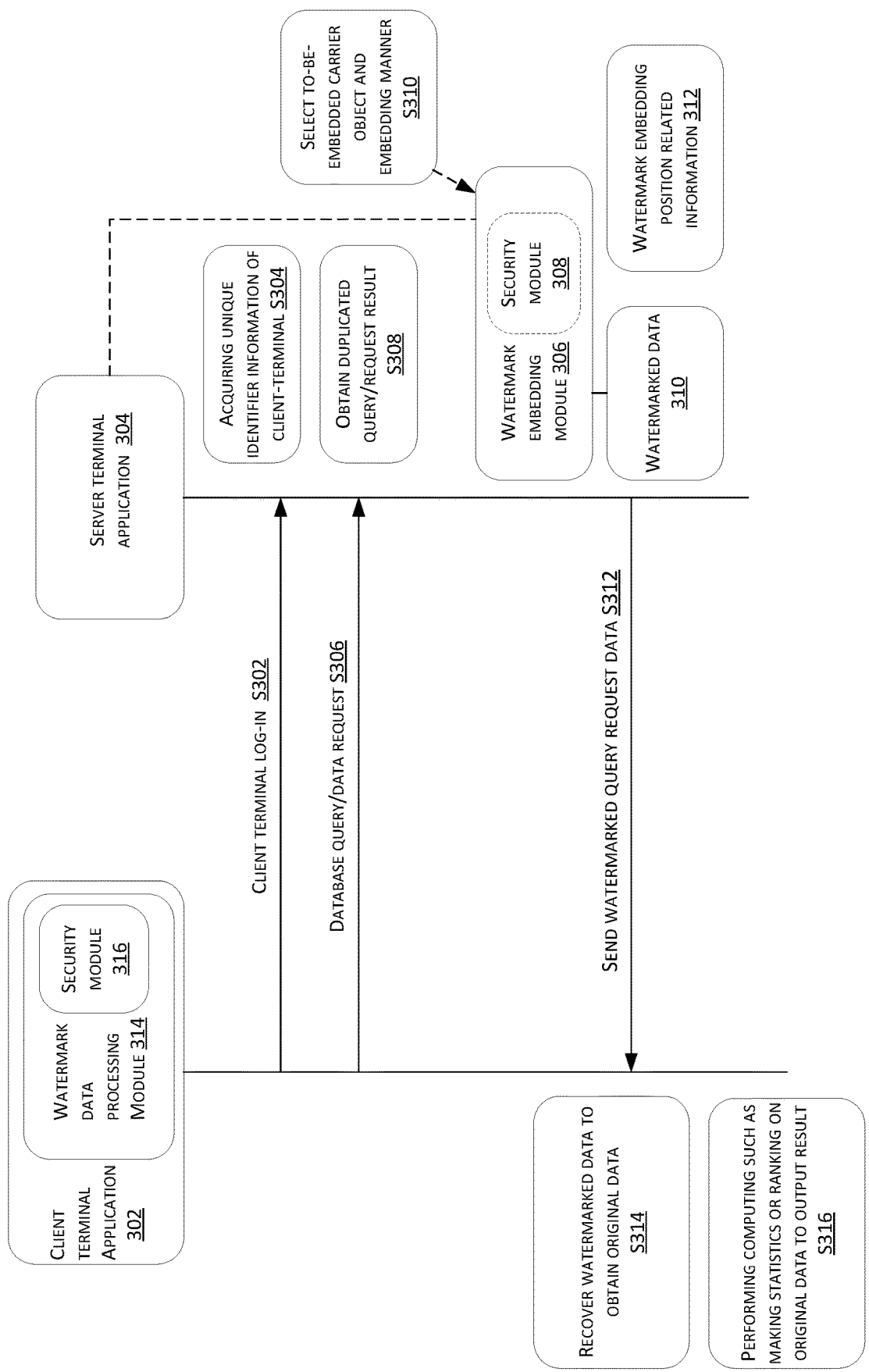
FIG. 3 is a diagram of interaction between a server terminal and a client terminal provided in an example embodiment of the present disclosure.

In order to more clearly illustrate the above two examples, an interaction between the client terminal and the server terminal will be introduced below in conjunction with FIG. 3.

At S302, a client terminal application 302 logs in to a database or a data query serve terminal application;

At S304, the server terminal application 304 acquires unique identifier information of the client terminal application 302.

At S306, the client terminal application 302 initiates a database query or data request.

At S308, the server terminal application 304 obtains the first query request data based on the data query request, and duplicates the first query request data to obtain a duplicated query/request result (the second query request data).

At S310, the server terminal application 304 invokes a watermark embedding module 306 and, in some examples, a security module 308, selects to-be-embedded carrier object data and an embedding manner, and embeds the unique identifier related information of the client terminal application as watermark information into the carrier object data;

At S312, the server terminal application 304 sends data after watermark processing (watermarked data 310) to the client terminal application 302 as a response to the request from the client terminal application 302. A response message of the server terminal application 304 may, for example, include watermark embedding position related information 312. For instance, the watermark is embedded into a second numerical data of each record.

At S314, the client terminal application 302 invokes a watermark data processing module 314, and, in some examples, a security module 316, uses, in some examples, watermark embedding position related information 312, and recovers (restores) the watermarked data to obtain original data.

At S316, the client terminal application 302 performs computing such as making statistics or ranking on the original data to output result.

For example, the client terminal application 302 and the watermark data processing module 314 may be integrated. The watermark data processing module 314 including the security module 316 is integrated into the client terminal application 302.

For example, the sever terminal application 304 and the watermark embedding module 306 may be logically separate entities.

For example, the to-be-embedded carrier object and the embedding manner may be self-adaptively selected, or be obtained by computing.

example embodiment III of the present disclosure provides a method for watermark embedding, which is described below in conjunction with FIG. 4.

Figure 4:
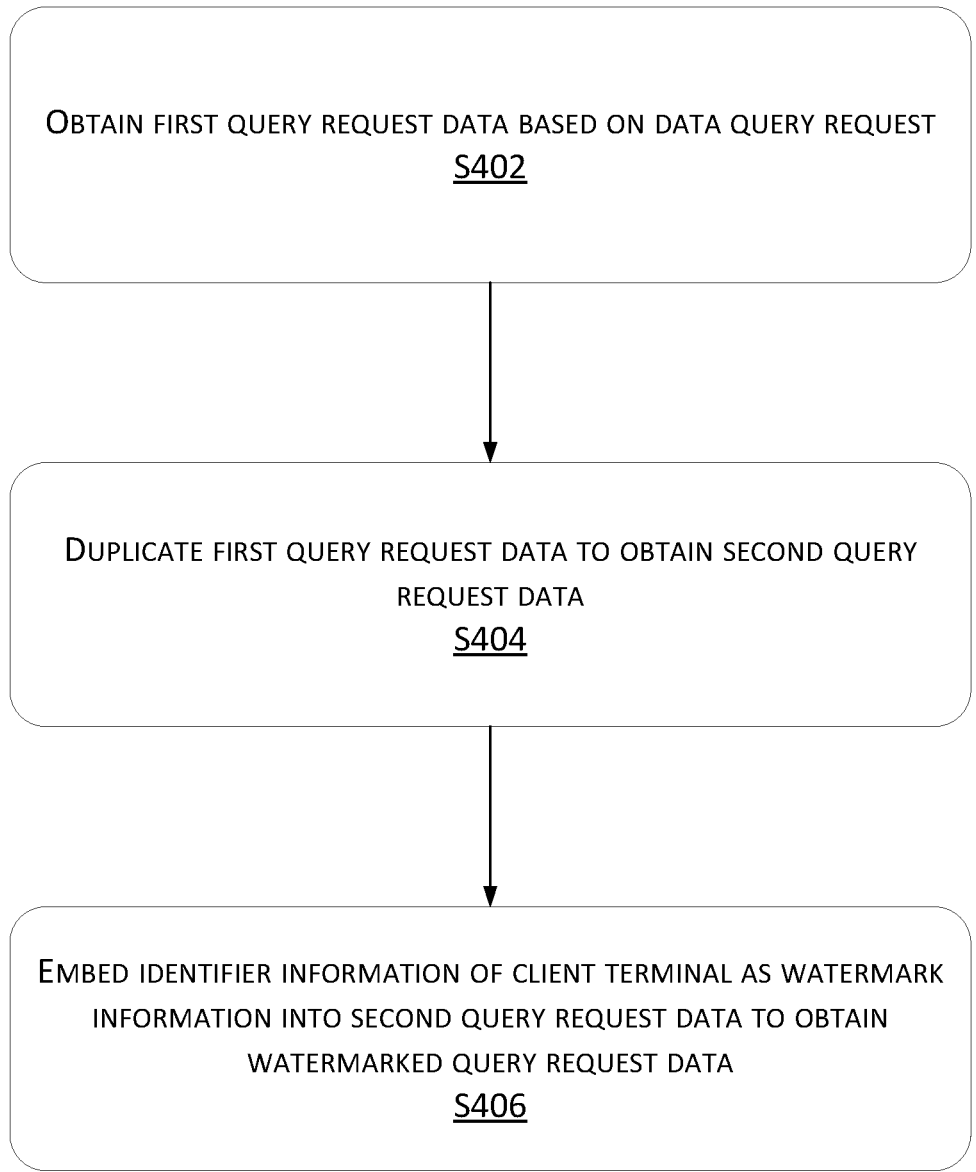
FIG. 4 is a flowchart of a method for watermark embedding provided in example embodiment III of the present disclosure.

As shown in FIG. 4, step S402 includes obtaining first query request data based on a data query request.

The first query request data refers to first query request data found from a database or dataset based on the data query request. The first query request data includes at least one data record in the database or dataset.

As shown in FIG. 4, step S404 includes duplicating the first query request data to obtain second query request data.

The second query request data is duplicated first query request data.

This step duplicates the first query request data to obtain the second query request data, thus providing a to-be-embedded carrier object for a watermark.

As shown in FIG. 4, step S406 includes embedding identifier information of the client terminal as watermark information into the second query request data to obtain watermarked query request data.

In an example embodiment, partial data of the watermarked second query request data may be selected for use as the watermarked carrier object data, and the method may further include: determining to-be-watermarked carrier object data in the second query request data; and the embedding identifier information of the client terminal as watermark information into the second query request data to obtain watermarked query request data includes:
embedding the identifier information of the client terminal as watermark information into the carrier object data to obtain the watermarked query request data.

The embedding the identifier information of the client terminal as watermark information into the carrier object data includes at least one of the following manners:
embedding the watermark information into the carrier object data by using an error correcting code;
inserting the watermark information as data into the carrier object data in accordance with a preset watermark embedding rule; or embedding the watermark information as key information into the carrier object data.

The watermark embedding terminal may first determine a manner of embedding the watermark information into the carrier object data; and then embed the identifier information of the client terminal as watermark information into the carrier object data in accordance with the determined manner of embedding the watermark information into the carrier object data.

The embedding the watermark information into the carrier object data by using an error correcting code includes:
converting the carrier object data into binary data;
encoding the binary data by using a Hamming encoding scheme with an error correcting capability to obtain encoded carrier object data;
converting the watermark information into binary watermark information;
embedding the binary watermark information into the encoded carrier object data; and
converting the watermarked carrier object data into decimal data.

A process of embedding the watermark information into the carrier object data by using an error correcting code will be introduced below in conjunction with specific examples:
providing a specific embedding rule: i.e., embedding '1' means to modify a bit '0' in data into '1,' and embedding '0' means to modify a bit '1' in the data into '0.' In practice, different watermark information embedding rules, or even a more complex embedding rule, may be provided. Particularly, in the case where the error correcting capability is more than 1 bit, a plurality of bits of watermark information may be embedded into a single piece of data.

A watermark embedding process:
1) First, a decimal numeral of carrier object data is converted into a binary numeral. Assuming that to-be-embedded carrier object data is a decimal numeral of 13, 13 is first converted into a binary numeral to obtain 1101.
2) Then, the resulting binary numeral is encoded by using a Hamming encoding scheme with a "1-bit" error correcting capability to obtain encoded carrier object data. In the above example, an encoded result C1=1101001 is obtained.
3) Watermark information is converted into binary watermark information. Assuming that the binary watermark information is 1, i.e., a bit '1' needs to be embedded. Because the to-be-embedded bit is '1,' a third bit '0' in C1 may be modified into '1,' to obtain C2=1111001.
4) The watermarked carrier object data is converted into decimal data. In the above example, C2 is converted into a decimal numeral C3=121. C3 is the resulting watermarked data.

A process of inserting the watermark information as data into the carrier object data in accordance with a preset watermark embedding rule will be introduced below in conjunction with specific examples.

It is assumed that the preset embedding rule is as follows: embedding a bit '1' means to insert a digit "1" into a bit of the carrier object data; similarly, embedding a bit '0' means to insert a digit "0" into a bit of the carrier object data; and an embedding position may be determined by adding a position identifier to a header of the numeral obtained after inserting "1" or "0."

Assuming that the to-be-watermarked carrier object data is decimal 85013, to-be-embedded watermark bit information is '1.'

A result obtained after embedding the bit information '1' into original data 85013 is 3815013, where the digit "3" represents that the embedded digit "1" is located at a 3rd bit from left of the watermarked carrier object data.

It should be noted that the binary information of the watermark information in the above example is inserted as data into decimal data of the carrier target data, or the binary information of the watermark information may be inserted as data into the binary data of the carrier object data. The decimal data of the carrier object data may be first converted into binary data, the binary information of the watermark information is inserted into the binary data of carrier object data, and then the binary data of the carrier object data is converted into the decimal data. For example, assuming that the to-be-watermarked carrier object data is decimal 85013, to-be-embedded watermark bit information is '1.' First, original data 85013 are converted into binary data "10100110000010101," and a result obtained after embedding the bit information '1' into the binary data is "11110100110000010101," where digits "11" represent that the embedded digit "1" is located at the 3rd bit from left of the watermarked carrier object data.

When the binary information of the watermark information is inserted as data into the decimal data of the carrier target data, the server terminal may further inform the client terminal of watermarked identifier information. In a practical application scenario, an identifier as to whether the carrier object data is watermarked may be provided, even though this is independent of watermark embedding and recovery principles. The identifier information may be computed through a mechanism together with a data associator, e.g., as a stand-alone field in a data record, or through some mechanisms. For example, the identifier information is computed with secret information and some fields in the data record as parameters. The informing the client terminal of watermarked identifier information includes: adding the watermarked identifier information to an end of the watermarked carrier object data. For example, for the above example 85013, the watermarked data and identifier may simultaneously arise in the form of "3815013 W," or "3815013 . . . Y," or "3815013 . . . '1.'

A process of embedding the watermark information as key information into the carrier object data will be introduced below in conjunction with specific examples.

1) Initialization: each client terminal stores a plurality of identical data encryption keys, and unique identifier information of the client terminal. There is a corresponding relationship between keys and one or more minimum partitions of identifiers. For example, client terminals A and B both store two keys K1 and K2, an identifier of A is 0110, and an identifier of B is 1011. The corresponding relationship between the keys and the one or more minimum partitions of identifiers is that: if a current bit of an identifier is '0,' then the identifier is encrypted by using the key K2, or otherwise, the identifier is encrypted by using the key K1.

2) Generating different encrypted data samples. How to generate different encrypted data samples will be illustrated below by way of examples. It is assumed that identical carrier object data D1, D2, D3, and D4 are queried at both the client terminals A and B. An encrypted data sample generated for A is $$SQA=\{Enc(D1,K2),Enc(D2,K1),Enc(D3,K1),Enc(D4,K2)\};$$

An encrypted data sample generated for B is $$SQB=\{Enc(D1,K1),Enc(D2,K2),Enc(D3,K1),Enc(D4,K1)\};$$

Enc is an encryption function, D1, D2, D3, and D4 represent to-be-encrypted data, and K1 and K2 represent keys for encryption.

For queries at A and B, a server-terminal application returns a query result SQA and a query result SQB, respectively.

The embedding the watermark information as key information into the carrier object data further includes:

feeding encryption identifier information and encrypted key information of the watermark information back to the client terminal.

Whether data is encrypted may be identified with a unified encrypted identifier, or with a different encrypted identifier. Functions of the encrypted identifier may also be replaced with other mechanisms. For example, the data may merely include information of an encryption key for determining that the data is encrypted or information assisting in determining the encryption key. Of course, the data may also include both the encrypted identifier as to whether the data is encrypted and the information of the encryption key for determining that the data is encrypted, or merely include the encrypted identifier without auxiliary information. An example of determining a data encryption key information is as follows. The information may be computed by the following manner:

$$H1=\text{Hash}(D1,D2,\ldots,Dn,\text{AppKey})\oplus\text{ID or} \quad \text{①}$$

$$H1=\text{Hash}(D1,D2,\ldots,Dn,\text{ID},\text{AppKey}) \text{ or} \quad \text{②}$$

$$H1=\text{Hash}(\text{ID},\text{AppKey},\text{PrimaryKey}) \text{ or} \quad \text{③}$$

$$H1=\text{Hash}(\text{AppKey},\text{PrimaryKey})\oplus\text{ID} \quad \text{④}$$

$\oplus$ represents an XOR operation, ID represents a unique identifier of a client-terminal application, and AppKey represents a common key of such client-terminal applications. A computing manner including a PrimaryKey applies to a data record having the PrimaryKey. For the first case, when a Hash result does not match an ID length, cutoff processing or filling a specific bit may be implemented. A bit sequence is obtained by the above two computing manners. It can be stipulated that which key is used for encryption is determined in accordance with a bit sequence value. For example, when there are only two keys K1 and K2, if a current bit of the bit sequence is '1,' then the encryption key K1 is used, or otherwise, the encryption key K2 is used.

In addition, a data number (serial number) of a watermark may be added to avoid errors such as insertion or deletion, which impact subsequent decrypted synchronization information.

In order to ensure that the watermark extraction terminal can correctly extract the first query request data, the watermark embedding terminal may further inform the watermark extraction terminal of the position information where the watermark information is embedded.

example embodiment IV of the present disclosure provides a method for watermark extraction, which is described in detail below in conjunction with FIG. 5.

Figure 5:
FIG. 5 is a flowchart of a method for watermark extraction provided in example embodiment IV of the present disclosure.

As shown in FIG. 5, step S502 includes acquiring watermarked query request data, the watermark information including identifier information of a client terminal.

As shown in FIG. 5, step S504 includes extracting the watermark information from the query request data.

The extracting the watermark information from the query request data includes:

converting decimal carrier object data in the query request data into binary data; and performing logical negation operation processing on an error correction bit at an error correction bit position of the binary data to obtain the watermark information.

Still using the example in example embodiment III, the watermark embedding terminal embeds the watermark information into the carrier object data by using an error correcting code and may extract the watermark information from the watermarked query request data as follows. It is assumed that the decimal carrier object data of the received query request data is C3'=121.

1) First, the decimal data C3'=121 are converted into binary data C2'=1111001

2) Using an error correction principle: an incorrect bit may be positioned from the binary data C2'=1111001, i.e., a third bit '1' from left, C1'=1101001 is obtained after performing logical negation operation processing on an error correction bit at an error correction bit position of the binary data. Watermarked information bit being '0' may be determined.

The extracting the watermark information from the query request data includes:

determining whether the query request data is watermarked based on watermarked identifier information;

determining an embedding position of the watermark information in accordance with a preset watermark extraction rule if the query request data is watermarked; and extracting the watermark information from the embedding position.

Still using an example in example embodiment III, 1) whether the query request data is watermarked is determined based on the watermarked identifier information. It is assumed that the watermarked identifier information of the query request data is "W." During processing of data "3815013 W," "W" identifies that data "3815013" is watermarked. The watermarked identifier information in the query request data is removed to obtain watermarked carrier object data "3815013." 2) The watermark information is extracted from the watermarked carrier object data in accordance with the preset watermark extraction rule (corresponding to a watermark embedding rule). For example, for the watermarked carrier object data "3815013," since a first digit is "3," an embedding position identifying an embedded bit '1' or '0' is the 3rd bit from left of the watermarked carrier object data. Since the 3rd bit is "1," embedded watermark bit information in the data is '1,' and a bit of watermark information '1' may be extracted.

When the watermark information is embedded as key information into the carrier object data, in case of data leakage, a corresponding encryption key is determined based on encrypted data or some possible auxiliary information (if any), and a corresponding client-terminal application identifier is reversely inferred based on the encryption key, to identify the source of data leakage.

After the query request data is disclosed to other parties, the watermark may be extracted by using the method of example embodiment IV of the present disclosure, to determine an original acquirer of the data, and achieve the purpose of traceability.

Corresponding to the method for data processing provided in example embodiment I of the present disclosure, example embodiment V of the present disclosure further provides an apparatus or data processing.

Figure 6:
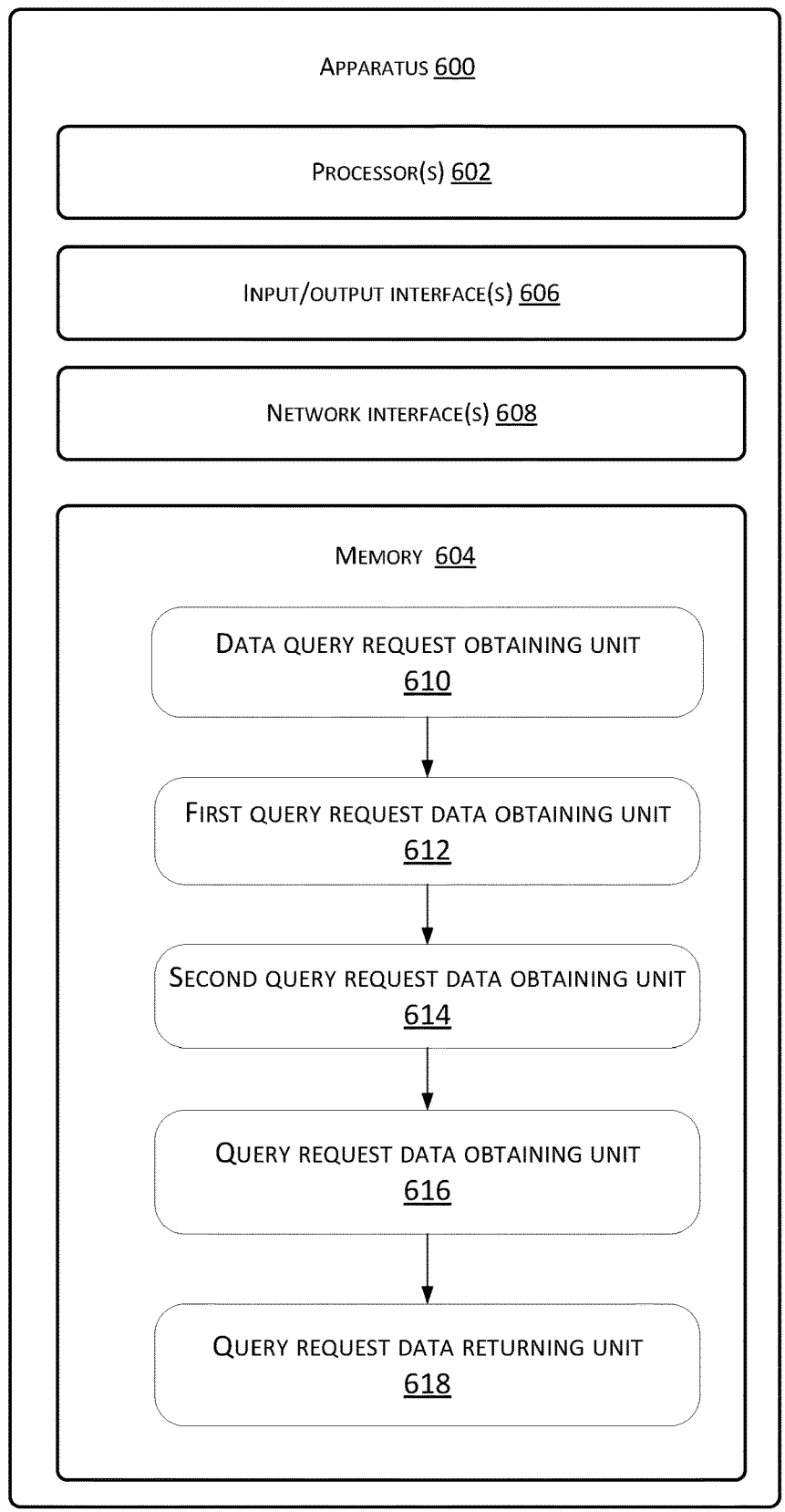
FIG. 6 is a schematic diagram of an apparatus for data processing provided in example embodiment V of the present disclosure.

As shown in FIG. 6, an apparatus 600 includes one or more processor(s) 602 or data processing unit(s) and memory 604. The apparatus 600 may further include one or more input/output interface(s) 606 and one or more network interface(s) 608. The memory 604 is an example of computer readable medium or media.

The memory 604 may store therein a plurality of modules or units as follows:

a data query request obtaining unit 610 configured to obtain a data query request sent by a client terminal;

a first query request data obtaining unit 612 configured to obtain first query request data based on the data query request;

a second query request data obtaining unit 614 configured to duplicate the first query request data to obtain second query request data;

a query request data obtaining unit 616 configured to embed identifier information of the client terminal as watermark information into the second query request data to obtain watermarked query request data; and a query request data returning unit 618 configured to feed the watermarked query request data back to the client terminal.

For example, the apparatus further includes:

a carrier object data determining unit configured to determine to-be-watermarked carrier object data in the second query request data; and the query request data obtaining unit is specifically configured to: embed identifier information of the client terminal as watermark information into the carrier object data to obtain watermarked query request data.

For example, the embedding the identifier information of the client terminal as watermark information into the carrier object data includes at least one of the following manners:

embedding the watermark information into the carrier object data by using an error correcting code;

inserting the watermark information as data into the carrier object data in accordance with a preset watermark embedding rule; or embedding the watermark information as key information into the carrier object data.

For example, the apparatus further includes:

an embedding manner determining unit configured to determine a manner of embedding the watermark information into the carrier object data; and the embedding the identifier information of the client terminal as watermark information into the carrier object data includes:

embedding the identifier information of the client terminal as watermark information into the carrier object data in accordance with the determined manner of embedding the watermark information into the carrier object data.

For example, the embedding the watermark information into the carrier object data by using an error correcting code includes:

converting the carrier object data into binary data;

encoding the binary data by using a Hamming encoding scheme with an error correcting capability to obtain encoded carrier object data;

converting the watermark information into binary watermark information;
embedding the binary watermark information into the encoded carrier object data to obtain watermarked carrier object data; and
converting the watermarked carrier object data into decimal data.

For example, the inserting the watermark information as data into the carrier object data in accordance with a preset watermark embedding rule includes: inserting the binary information of the watermark information as data into binary or decimal data of the carrier object data in accordance with the preset watermark embedding rule.

For example, the apparatus further includes: an identifier information informing unit configured to inform the client terminal of watermarked identifier information.

For example, the identifier information informing unit is specifically configured to:
add the watermarked identifier information to an end of the watermarked carrier object data.

For example, the query request data returning unit is further configured to:
feed encryption identifier information and/or encrypted key information of the watermark information back to the client terminal.

For example, the query request data returning unit is further configured to:
feed position information where the watermark information is embedded back to the client terminal.

It should be noted that related description of example embodiment I of the present disclosure may be referred to for detailed description of the apparatus for data processing provided in example embodiment V of the present disclosure. The description will not be repeated here.

Corresponding to the method for data processing provided in example embodiment I of the present disclosure, example embodiment VI of the present disclosure further provides an electronic device.

Figure 7:
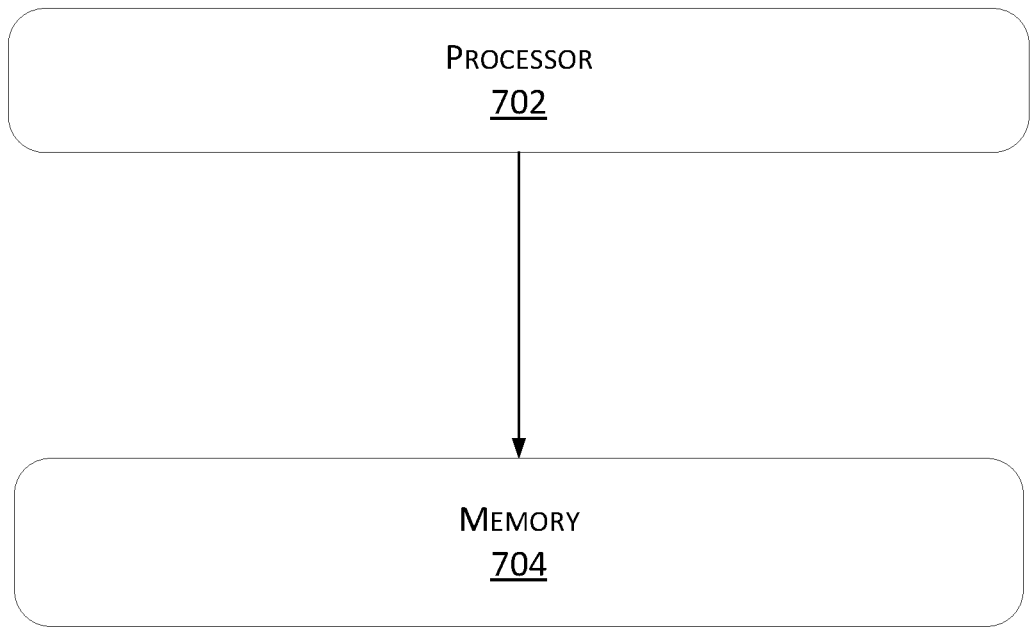
FIG. 7 is a schematic diagram of an electronic device provided in example embodiment VI of the present disclosure.

As shown in FIG. 7, the electronic device includes:
An electronic device includes:
a processor 702; and
a memory 704 configured to store a program of a method for data processing, where the device, after being powered on and running the program of the method for data processing by the processor, executes the following steps:
obtaining a data query request sent by a client terminal;
obtaining first query request data based on the data query request;
duplicating the first query request data to obtain second query request data;
embedding identifier information of the client terminal as watermark information into the second query request data to obtain watermarked query request data; and
feeding the watermarked query request data back to the client terminal.

For example, the electronic device is further configured to execute the following steps:
determining to-be-watermarked carrier object data in the second query request data; and
the embedding identifier information of the client terminal as watermark information into the second query request data to obtain watermarked query request data includes:
embedding the identifier information of the client terminal as watermark information into the carrier object data to obtain the watermarked query request data.

For example, the embedding the identifier information of the client terminal as watermark information into the carrier object data includes at least one of the following manners:
embedding the watermark information into the carrier object data by using an error correcting code;
inserting the watermark information as data into the carrier object data in accordance with a preset watermark embedding rule; or
embedding the watermark information as key information into the carrier object data.

For example, the electronic device is further configured to execute the following steps:
determining a manner of embedding the watermark information into the carrier object data; and
the embedding the identifier information of the client terminal as watermark information into the carrier object data includes:
embedding the identifier information of the client terminal as watermark information into the carrier object data in accordance with the determined manner of embedding the watermark information into the carrier object data.

For example, the embedding the watermark information into the carrier object data by using an error correcting code includes:
converting the carrier object data into binary data;
encoding the binary data by using a Hamming encoding scheme with an error correcting capability to obtain encoded carrier object data;
converting the watermark information into binary watermark information;
embedding the binary watermark information into the encoded carrier object data to obtain watermarked carrier object data; and
converting the watermarked carrier object data into decimal data.

For example, the inserting the watermark information as data into the carrier object data in accordance with a preset watermark embedding rule includes: inserting the binary information of the watermark information as data into binary or decimal data of the carrier object data in accordance with the preset watermark embedding rule.

For example, the electronic device is further configured to execute the following step: informing the client terminal of watermarked identifier information.

For example, the informing the client terminal of watermarked identifier information includes:
adding the watermarked identifier information to an end of the watermarked carrier object data.

For example, the embedding the watermark information as key information into the carrier object data further includes:
feeding encryption identifier information and/or encrypted key information of the watermark information back to the client terminal.

For example, the electronic device is further configured to execute the following step:
feeding position information where the watermark information is embedded back to the client terminal.

It should be noted that related description of example embodiment I of the present disclosure may be referred to for detailed description of the electronic device provided in example embodiment VI of the present disclosure. The description will not be repeated here.

Corresponding to the method for data processing provided in example embodiment I of the present disclosure, example embodiment VII of the present disclosure further provides a storage device, storing a program of a method for data processing. The program, when executed by a processor, executes the following steps:

obtaining a data query request sent by a client terminal;

obtaining first query request data based on the data query request;

duplicating the first query request data to obtain second query request data;

embedding identifier information of the client terminal as watermark information into the second query request data to obtain watermarked query request data; and feeding the watermarked query request data back to the client terminal.

It should be noted that related description of example embodiment I of the present disclosure may be referred to for detailed description of the storage device provided in example embodiment VII of the present disclosure. The description will not be repeated here.

Corresponding to the method for data processing provided in example embodiment II of the present disclosure, example embodiment VIII of the present disclosure provides an apparatus for data processing.

Figure 8:
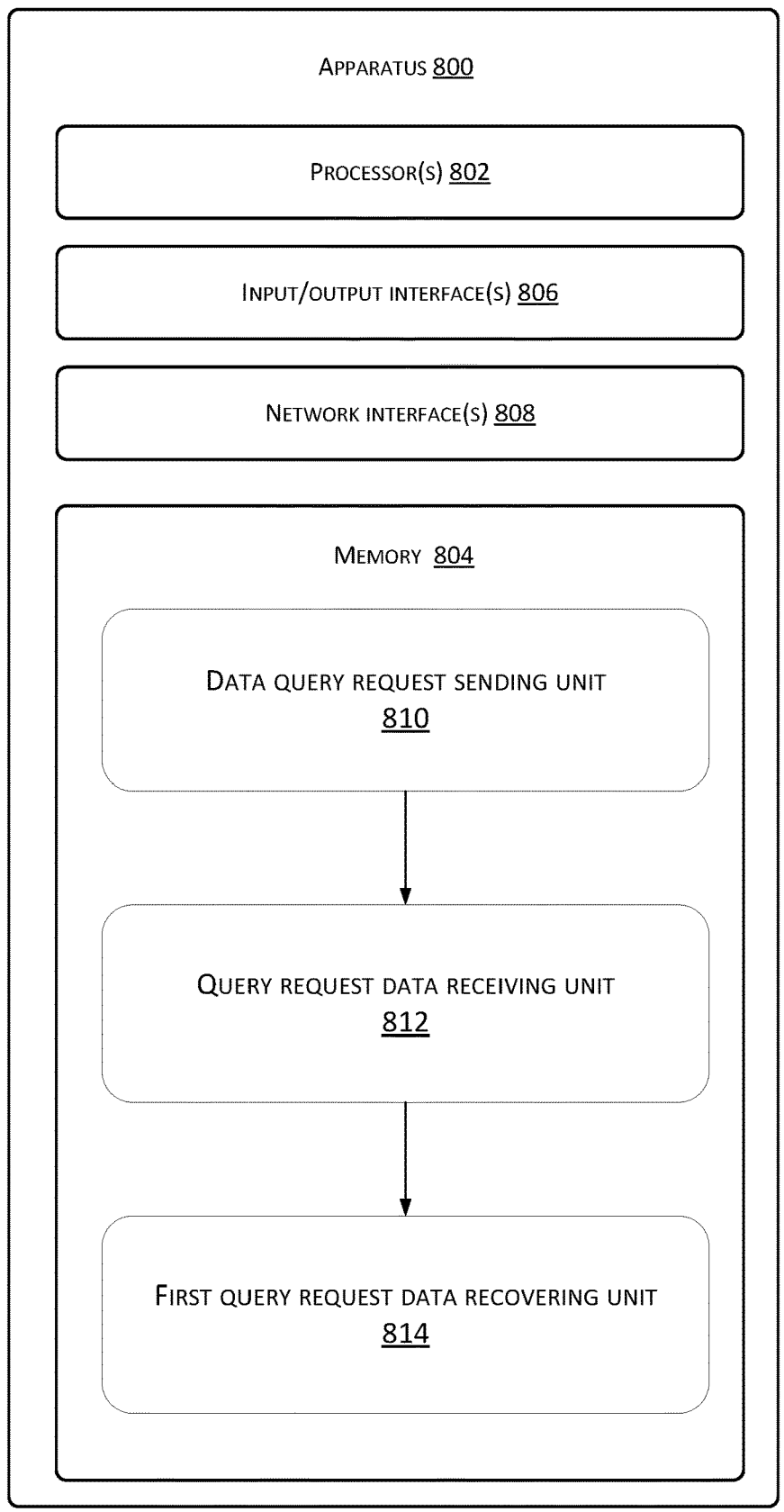
FIG. 8 is a schematic diagram of an apparatus for data processing provided in example embodiment VIII of the present disclosure.
Figure 9:
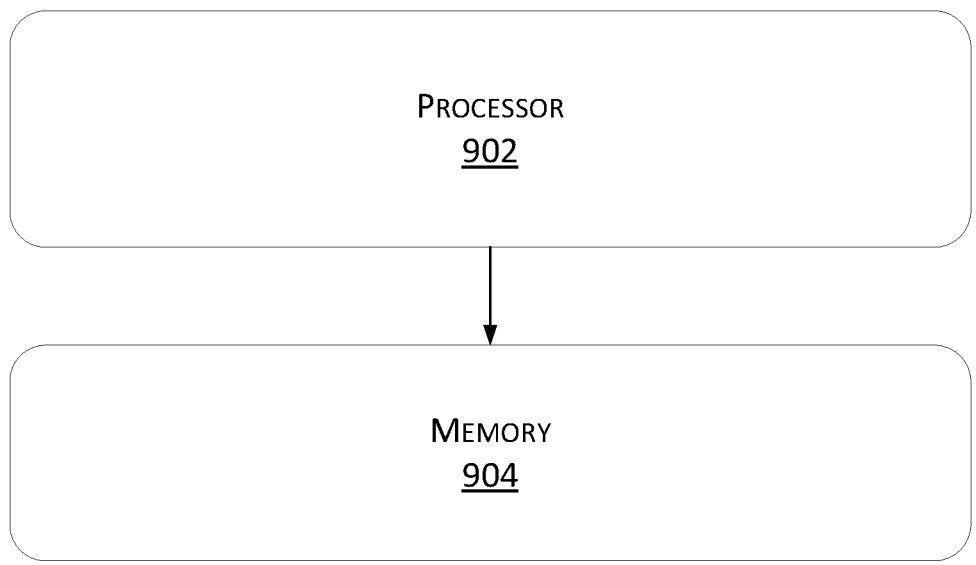
FIG. 9 is a schematic diagram of an electronic device provided in example embodiment IX of the present disclosure.

As shown in FIG. 8, an apparatus 800 includes one or more processor(s) 802 or data processing unit(s) and memory 804. The apparatus 800 may further include one or more input/output interface(s) 806 and one or more network interface(s) 808. The memory 804 is an example of computer readable medium or media.

The memory 804 may store therein a plurality of modules or units as follows:

a data query request sending unit 810 configured to send a data query request to a server terminal;

a query request data receiving unit 812 configured to receive watermarked query request data returned from the server terminal; and a first query request data recovering unit 814 configured to recover first query request data from the watermarked query request data.

For example, the first query request data recovering unit is specifically configured to: delete watermark information in the watermarked query request data to obtain the first query request data.

For example, the first query request data recovering unit is specifically configured to:

convert decimal carrier object data in the watermarked query request data into binary data;

delete an error correction bit in the binary data; and convert the binary data with the error correction bit deleted into decimal data to obtain the first query request data.

For example, the first query request data recovering unit is specifically configured to:

determine whether the query request data is watermarked based on watermarked identifier information;

remove the watermarked identifier information in the query request data if the query request data is watermarked; and delete binary information of the watermark information in the binary or decimal data of the carrier object data in accordance with a preset watermark recovery rule to obtain the first query request data.

It should be noted that related description of example embodiment II of the present disclosure may be referred to for detailed description of the apparatus for data processing provided in example embodiment VIII of the present disclosure. The description will not be repeated here.

Corresponding to the method for data processing provided in example embodiment II of the present disclosure, example embodiment IX of the present disclosure provides an electronic device, including:

a processor 902; and a memory 904 configured to store a program of a method for data processing, where the device, after being powered on and running the program of the method for data processing by the processor, executes the following steps:

sending a data query request to a server terminal;

receiving watermarked query request data returned from the server terminal; and recovering first query request data from the watermarked query request data.

For example, the recovering first query request data from the watermarked query request data includes: deleting watermark information in the watermarked query request data to obtain the first query request data.

For example, the deleting watermark information in the watermarked query request data to obtain the first query request data includes:

converting decimal carrier object data in the watermarked query request data into binary data;

deleting an error correction bit in the binary data; and converting the binary data with the error correction bit deleted into decimal data to obtain the first query request data.

For example, the deleting watermark information in the watermarked query request data to obtain the first query request data includes:

determining whether the query request data is watermarked based on watermarked identifier information;

removing the watermarked identifier information in the query request data if the query request data is watermarked; and deleting binary information of the watermark information in the binary or decimal data of the carrier object data in accordance with a preset watermark recovery rule to obtain the first query request data.

It should be noted that related description of example embodiment II of the present disclosure may be referred to for detailed description of the electronic device provided in example embodiment IX of the present disclosure. The description will not be repeated here.

Corresponding to the method for data processing provided in example embodiment II of the present disclosure, example embodiment X of the present disclosure provides a storage device configured to:

store a program of a method for data processing, wherein the program is run by a processor to execute the following steps:

sending a data query request to a server terminal;

receiving watermarked query request data returned from the server terminal; and recovering first query request data from the watermarked query request data.

It should be noted that related description of example embodiment II of the present disclosure may be referred to for detailed description of the storage device provided in example embodiment X of the present disclosure. The description will not be repeated here.

The present disclosure is disclosed as above based on the example embodiments, which are not intended to limit the present disclosure. Anyone skilled in the art may make possible alterations and modifications without departing from the spirit and scope of the present disclosure. Therefore, the scope of protection of the present disclosure should be subject to the scope defined by the appended claims of the present disclosure.

In a typical configuration, a computing device includes one or more processors (CPU), an input/output interface, a network interface, and a memory.

The memory may include forms, such as a volatile memory, a random access memory (K'), and/or a nonvolatile memory, e.g., a read only memory (ROM) or a flash RAM, in a computer readable medium. The memory is an example of the computer readable medium.

The computer readable medium includes permanent/non-permanent media and removable/non-removable media that can achieve information storage by any method or technology. The information may be a computer readable instruction, a data structure, a program module, or other data. examples of the computer storage medium include, but are not limited to, a phase-change random access memory (PRAM), a static random access memory (SRAM), a dynamic random access memory (DRAM), a random access memory (RAM) of other type, a read only memory (ROM), an electrically erasable programmable read only memory (EEPROM), a flash RAM or other internal memory technology, a compact disc read only memory (CD-ROM), a digital versatile disc (DVD) or other optical storage, a magnetic cassette tape, and a magnetic tape or magnetic disk storage or other magnetic storage device, or any other non-transmission medium, which can be configured to store information that can be accessed by the computing device. As defined herein, the computer readable medium excludes transitory media, e.g., a modulated data signal or carrier wave.

It should be appreciated by those skilled in the art that the example embodiments of the present disclosure may be provided as a method, system, or computer program product. Accordingly, the present disclosure may be implemented as a completely hardware example embodiment, a completely software example embodiment, or an example embodiment which is a combination of software and hardware. Further, the present disclosure may take a form of one or more computer program products implemented on a computer usable storage medium (including but not limited to a disk storage, a CD-ROM, an optical memory, etc.) containing a computer usable program code.

The present disclosure may further be understood with clauses as follows.

Clause 1. A method for data processing, comprising:
obtaining a data query request sent by a client terminal;
obtaining first query request data based on the data query request;
duplicating the first query request data to obtain second query request data;
embedding identifier information of the client terminal as watermark information into the second query request data to obtain watermarked query request data; and
feeding the watermarked query request data back to the client terminal.

Clause 2. The method according to clause 1, wherein the method further comprises:
determining to-be-watermarked carrier object data in the second query request data; and
the embedding identifier information of the client terminal as watermark information into the second query request data to obtain watermarked query request data comprises: embedding the identifier information of the client terminal as watermark information into the carrier object data to obtain the watermarked query request data.

Clause 3. The method according to clause 2, wherein the embedding the identifier information of the client terminal as watermark information into the carrier object data comprises at least one of the following manners:
embedding the watermark information into the carrier object data by using an error correcting code;
inserting the watermark information as data into the carrier object data in accordance with a preset watermark embedding rule; and
embedding the watermark information as key information into the carrier object data.

Clause 4. The method according to clause 3, wherein the method further comprises:
determining a manner of embedding the watermark information into the carrier object data; and
the embedding the identifier information of the client terminal as watermark information into the carrier object data comprises: embedding the identifier information of the client terminal as watermark information into the carrier object data in accordance with the determined manner of embedding the watermark information into the carrier object data.

Clause 5. The method according to clause 3, wherein the embedding the watermark information into the carrier object data by using an error correcting code comprises:
converting the carrier object data into binary data;
encoding the binary data by using a Hamming encoding scheme with an error correcting capability to obtain encoded carrier object data;
converting the watermark information into binary watermark information;
embedding the binary watermark information into the encoded carrier object data to obtain watermarked carrier object data; and
converting the watermarked carrier object data into decimal data.

Clause 6. The method according to clause 3, wherein the inserting the watermark information as data into the carrier object data in accordance with a preset watermark embedding rule comprises: inserting binary information of the watermark information as data into binary or decimal data of the carrier object data in accordance with the preset watermark embedding rule.

Clause 7. The method according to clause 6, wherein the method further comprises: informing the client terminal of watermarked identifier information.

Clause 8. The method according to clause 7, wherein the informing the client terminal of watermarked identifier information comprises:
adding the watermarked identifier information to an end of the watermarked carrier object data.

Clause 9. The method according to clause 3, wherein the embedding the watermark information as key information into the carrier object data further comprises:
feeding encryption identifier information and/or encrypted key information of the watermark information back to the client terminal.

Clause 10. The method according to clause 1 or 9, wherein the method further comprises:
feeding position information where the watermark information is embedded back to the client terminal.

Clause 11. A method for data processing, comprising:
sending a data query request to a server terminal;
receiving watermarked query request data returned from the server terminal; and
recovering first query request data from the watermarked query request data.

Clause 12. The method according to clause 11, wherein the recovering first query request data from the watermarked query request data comprises: deleting watermark information in the watermarked query request data to obtain the first query request data.

Clause 13. The method according to clause 12, wherein the deleting watermark information in the watermarked query request data to obtain the first query request data comprises:
converting decimal carrier object data in the watermarked query request data into binary data;
deleting an error correction bit in the binary data; and
converting the binary data with the error correction bit deleted into decimal data to obtain the first query request data.

Clause 14. The method according to clause 12, wherein the deleting watermark information in the watermarked query request data to obtain the first query request data comprises:
determining whether the query request data is watermarked based on watermarked identifier information;
removing the watermarked identifier information in the query request data if the query request data is watermarked; and
deleting binary information of the watermark information in the binary or decimal data of the carrier object data in accordance with a preset watermark recovery rule to obtain the first query request data.

Clause 15. A method for embedding a watermark, comprising:
obtaining first query request data based on a data query request;
duplicating the first query request data to obtain second query request data; and
embedding identifier information of a client terminal as watermark information into the second query request data to obtain watermarked query request data.

Clause 16. The method according to clause 15, wherein the method further comprises:
determining to-be-watermarked carrier object data in the second query request data; and
the embedding identifier information of a client terminal as watermark information into the second query request data to obtain watermarked query request data comprises: embedding the identifier information of the client terminal as watermark information into the carrier object data to obtain the watermarked query request data.

Clause 17. The method according to clause 16, wherein the embedding the identifier information of the client terminal as watermark information into the carrier object data comprises at least one of the following manners:
embedding the watermark information into the carrier object data by using an error correcting code;
inserting the watermark information as data into the carrier object data in accordance with a preset watermark information embedding rule; and
embedding the watermark information as key information into the carrier object data.

Clause 18. The method according to clause 17, wherein the embedding the watermark information into the carrier object data by using an error correcting code comprises:
converting the carrier object data into binary data;
encoding the binary data by using a Hamming encoding scheme with an error correcting capability to obtain encoded carrier object data;
converting the watermark information into binary watermark information;
embedding the binary watermark information into the encoded carrier object data; and
converting the watermarked carrier object data into decimal data.

Clause 19. The method according to clause 17, wherein the inserting the watermark information as data into the carrier object data in accordance with a preset watermark embedding rule comprises: inserting binary information of the watermark information as data into binary or decimal data of the carrier object data in accordance with the preset watermark embedding rule.

Clause 20. The method according to clause 19, wherein the method further comprises:
adding watermarked identifier information to an end of the watermarked carrier object data.

Clause 21. A method for watermark extraction, comprising:
acquiring watermarked query request data, the watermark information comprising identifier information of a client terminal; and
extracting the watermark information from the query request data.

Clause 22. The method according to clause 21, wherein the extracting the watermark information from the query request data comprises:
converting decimal carrier object data in the query request data into binary data; and
performing logical negation operation processing on an error correction bit at an error correction bit position of the binary data to obtain the watermark information.

Clause 23. The method according to clause 21, wherein the extracting the watermark information from the query request data comprises:
determining whether the query request data is watermarked based on watermarked identifier information;
determining an embedding position of the watermark information in accordance with a preset watermark recovery rule if the query request data is watermarked; and
extracting the watermark information from the embedding position.

Clause 24. An apparatus for data processing, comprising:
a data query request obtaining unit configured to obtain a data query request sent by a client terminal;
a first query request data obtaining unit configured to obtain first query request data based on the data query request;
a second query request data obtaining unit configured to duplicate the first query request data to obtain second query request data;
a query request data obtaining unit configured to embed identifier information of the client terminal as watermark information into the second query request data to obtain watermarked query request data; and
a query request data returning unit configured to feed the watermarked query request data back to the client terminal.

Clause 25. An electronic device, comprising:
a processor; and
a memory configured to store a program of a method for data processing, wherein the device, after being powered on and running the program of the method for data processing by the processor, executes the following steps:
obtaining a data query request sent by a client terminal;
obtaining first query request data based on the data query request;
duplicating the first query request data to obtain second query request data;
embedding identifier information of the client terminal as watermark information into the second query request data to obtain watermarked query request data; and
feeding the watermarked query request data back to the client terminal.

Clause 26. A storage device configured to store a program of a method for data processing, wherein the program is run by a processor to execute the following steps:
obtaining a data query request sent by a client terminal;
obtaining first query request data based on the data query request;
duplicating the first query request data to obtain second query request data;
embedding identifier information of the client terminal as watermark information into the second query request data to obtain watermarked query request data; and
feeding the watermarked query request data back to the client terminal.

Clause 27. An apparatus for data processing, comprising:
a data query request sending unit configured to send a data query request to a server terminal;
a query request data receiving unit configured to receive watermarked query request data returned from the server terminal; and
a first query request data recovering unit configured to recover first query request data from the watermarked query request data.

Clause 28. An electronic device, comprising:
a processor; and
a memory configured to store a program of a method for data processing, wherein the device, after being powered on and running the program of the method for data processing by the processor, executes the following steps:
sending a data query request to a server terminal;
receiving watermarked query request data returned from the server terminal; and
recovering first query request data from the watermarked query request data.

Clause 29. A storage device configured to store a program of a method for data processing, wherein the program is run by a processor to execute the following steps:
sending a data query request to a server terminal;
receiving watermarked query request data returned from the server terminal; and
recovering first query request data from the watermarked query request data.

What is claimed is:

1. A method comprising:
obtaining a data query request sent by a client terminal;
obtaining first query request data based on the data query request;
duplicating the first query request data to obtain second query request data;
determining to-be-watermarked carrier object data in the second query request data; and
embedding watermark information into the second query request data to obtain watermarked query request data, wherein the embedding comprises at least one of:
embedding the watermark information into the to-be-watermarked carrier object data by using an error correcting code;
inserting the watermark information into the to-be-watermarked carrier object data in accordance with a preset watermark embedding rule; or
embedding the watermark information as key information into the to-be-watermarked carrier object data.

2. The method of claim 1, further comprising feeding the watermarked query request data back to the client terminal.

3. The method of claim 1 wherein embedding the watermark information into the to-be-watermarked carrier object data by using the error correcting code comprises:
converting the to-be-watermarked carrier object data into binary data;
encoding the binary data by using an encoding scheme with an error correcting capability to obtain encoded carrier object data;
converting the watermark information into binary watermark information;
embedding the binary watermark information into the encoded carrier object data to obtain watermarked carrier object data; and
converting the watermarked carrier object data into decimal data.

4. The method of claim 3, wherein the encoding scheme includes a Hamming encoding scheme.

5. The method of claim 1, wherein inserting the watermark information into the to-be-watermarked carrier object data in accordance with the preset watermark embedding rule comprises:
determining the preset watermark embedding rule; and
inserting binary information of the watermark information as data into binary or decimal data of the to-be-watermarked carrier object data in accordance with the preset watermark embedding rule.

6. The method of claim 1 wherein embedding the watermark information as the key information into the to-be-watermarked carrier object data comprises:
feeding encrypted key information of the watermark information back to the client terminal.

7. The method of claim 1 wherein embedding the watermark information into the second query request data to obtain watermarked query request data comprises embedding identifier information of the client terminal as the watermark information into the to-be-watermarked carrier object data to obtain the watermarked query request data.

8. The method of claim 7, wherein embedding the identifier information of the client terminal as the watermark information into the to-be-watermarked carrier object data to obtain the watermarked query request data comprises:
embedding the identifier information of the client terminal into the to-be-watermarked carrier object data by using an error correcting code;
inserting the identifier information of the client terminal into the to-be-watermarked carrier object data in accordance with a preset watermark embedding rule; or
embedding the identifier information of the client terminal as key information into the to-be-watermarked carrier object data.

9. The method of claim 8, further comprising informing the client terminal of watermarked identifier information.

10. The method of claim 9 wherein informing the client terminal of the watermarked identifier information comprises:
adding the watermarked identifier information to an end of the watermarked carrier object data.

11. The method of claim 1, further comprising feeding position information where the watermark information is embedded back to the client terminal.

12. The method of claim 1, wherein the obtaining first query request data based on the data query request comprising searching the first query request data from a database based on the data query request.

13. An apparatus comprising:
one or more processors; and
one or more memories storing computer readable instructions that, executable by the one or more processors, cause the one or more processors to perform acts comprising:
sending a data query request to a server terminal;
receiving watermarked query request data that is embedded with watermark information from the server terminal; and
recovering first query request data from the watermarked query request data, the recovering comprising deleting the watermark information in the watermarked query request data to obtain the first query request data, wherein the deleting comprises:
converting decimal carrier object data in the watermarked query request data into binary data;
deleting an error correction bit in the binary data; and
converting the binary data with the error correction bit deleted into decimal data to obtain the first query request data.

14. The apparatus of claim 13, wherein deleting the watermark information in the watermarked query request data to obtain the first query request data comprises:
determining that the watermarked query request data is watermarked based on watermarked identifier information;
removing the watermarked identifier information in the watermarked query request data in response to determining that the watermarked query request data is watermarked; and
deleting binary information of the watermark information in the binary data or the decimal data in accordance with a preset watermark recovery rule to obtain the first query request data.

15. One or more memories storing computer readable instructions that, executable by one or more processors of a watermark embedding terminal, cause the one or more processors to perform acts comprising:
acquiring watermarked query request data that is embedded with watermark information, the watermark information comprising identifier information of a client terminal; and
extracting the watermark information from the watermarked query request data, the extracting comprises:
determining that the watermarked query request data is watermarked based on watermarked identifier information;
determining an embedding position of the watermark information in accordance with a preset watermark recovery rule; and
extracting the watermark information from the embedding position.

* * * * *